Figure 4:
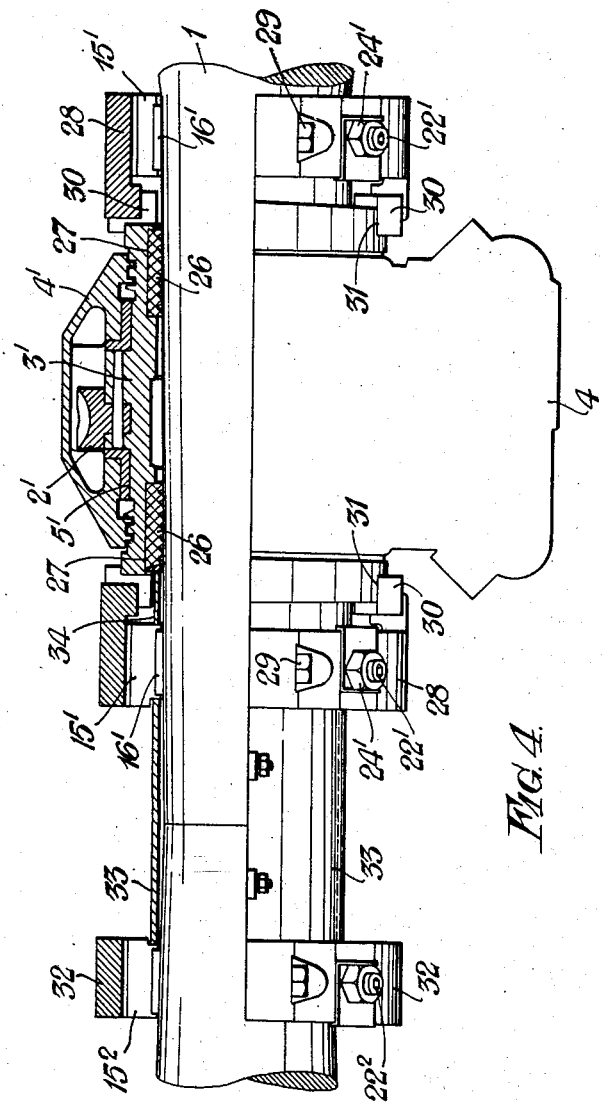

Dec. 29, 1953
L. R. NIXON
2,664,003
POWER TRANSMISSION GEARING FOR
THE RUNNING AXLE OF VEHICLES
Filed July 25, 1949
4 Sheets-Sheet 1
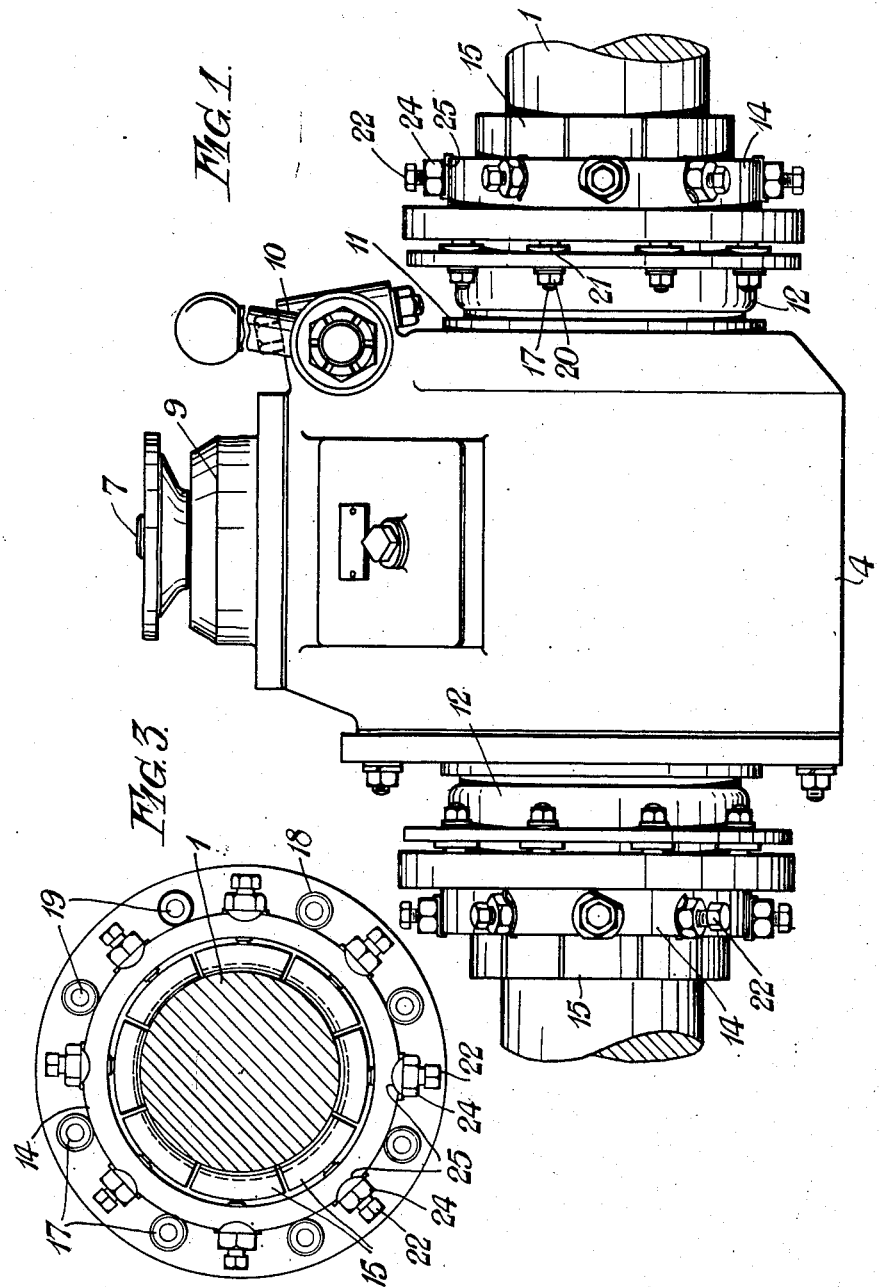
Inventor
Leslie Reginald Nixon
by Sommers & Young
Attorneys Dec. 29, 1953
L. R. NIXON
2,664,003
POWER TRANSMISSION GEARING FOR
THE RUNNING AXLE OF VEHICLES
Filed July 25, 1949
4 Sheets-Sheet 2
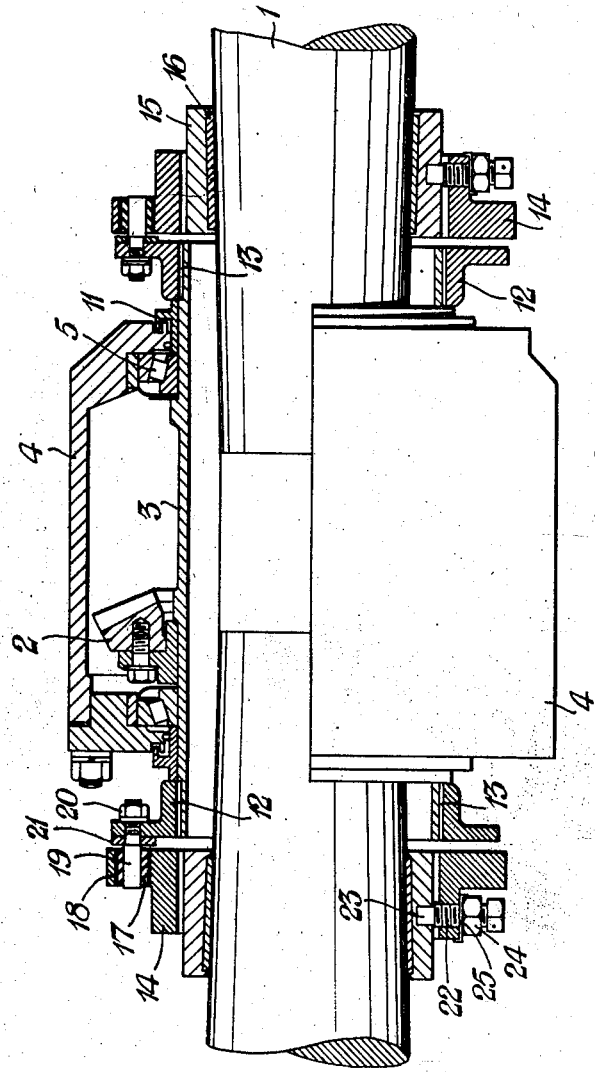

Inventor
Leslie Reginald Nixon
by Sommers + Young
Attorneys

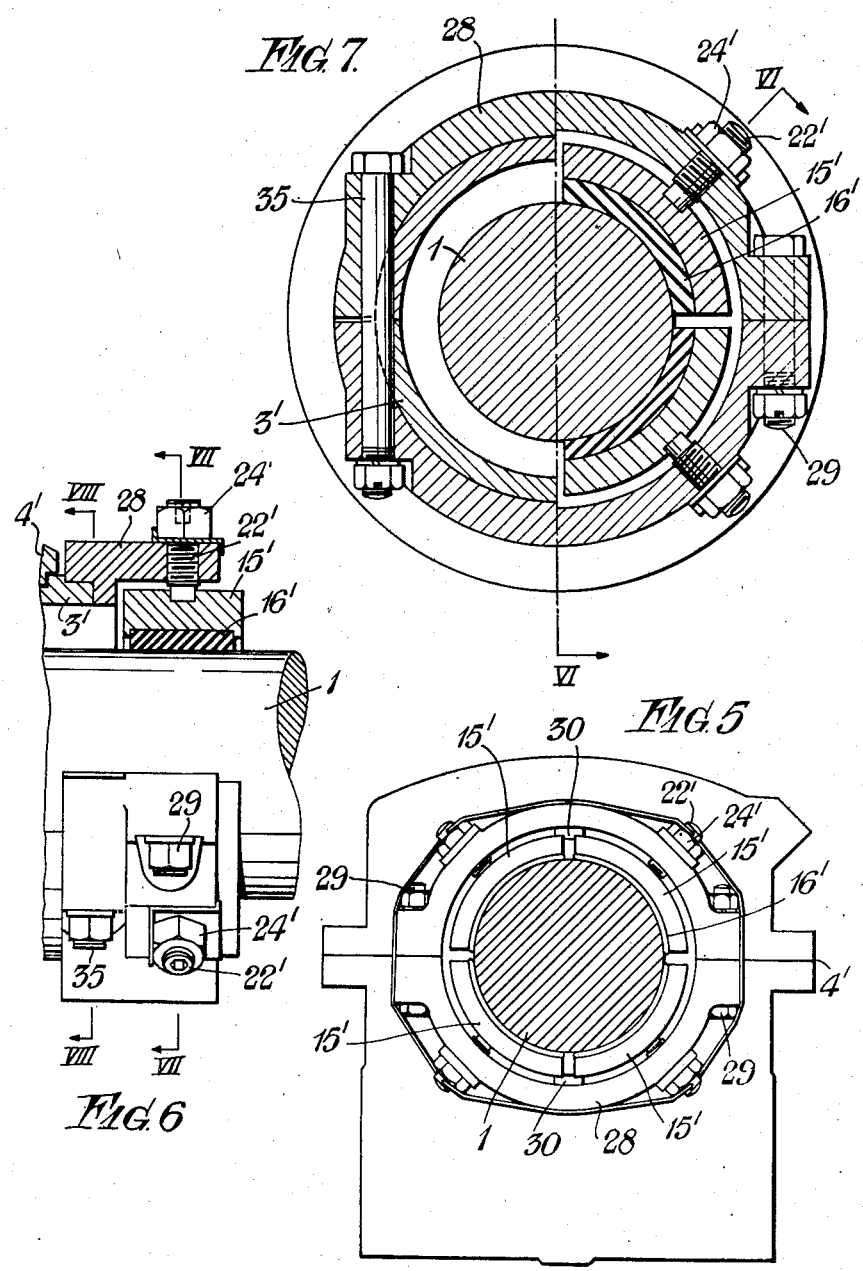

Patented Dec. 29, 1953

2,664,003

UNITED STATES PATENT OFFICE 2,664,003

POWER TRANSMISSION GEARING FOR THE RUNNING AXLE OF VEHICLES

Leslie Reginald Nixon, New Eltham, London, England, assignor to J. Stone & Company Limited, London, England, a company of Great Britain Application July 25, 1949, Serial No. 106,640

Claims priority, application Great Britain July 26, 1948

1 Claim. (Cl. 64—11)

This invention concerns improvements relating to power-transmission gearing for the running axles of vehicles, particularly such gearing for driving generators, compressors and like auxiliary equipment on railway vehicles.

According to the present invention, in a power-transmission gearing arrangement for the purpose set forth, the gearing is resiliently supported from the axle and an annular part or parts through which the drive is transmitted, and/or through which the gearing is carried, from the axle are adapted for being centered in relation to the axle by means of jacking devices.

The jacking devices themselves may or may not be utilised for transmitting the drive, and/or to carry the gearing, from the axle during running of the gearing.

In one arrangement according to the invention, resilient coupling elements are provided between the annular part or parts and the gearing for transmitting the drive, and/or for carrying the gearing, from the axle.

In another arrangement according to the invention, the gearing itself is resiliently mounted upon the axle, for example by means of resilient pads, and the driving gear wheel is coupled to the annular part or parts by coupling means such as dogs, permitting relative radial displacement.

In yet another arrangement in accordance with the invention, the jacking devices engage the axle through resilient elements, for example cushioning pad-linings of resilient material.

Various embodiments of the invention by way of example will now be more fully described with reference to the accompanying drawings, in which:

Figure 1 is a plan view of a first embodiment,

Figure 2 a longitudinal section thereof, the upper half showing a section through the coupling elements and the lower half sections through the jacking devices, Figure 3 an end view of the jacking devices and coupling elements, Figure 4 partly a longitudinal section and partly an elevation of a second embodiment, Figure 5 an end view thereof, Figure 6 partly a longitudinal section (on the line VI—VI in Figure 7) and partly on elevation of a third embodiment, and Figure 7 a cross-section thereof, the right and left hand sides of the section being respectively taken on the lines VII—VII and VIII—VIII in Figure 6.

The illustrated embodiments are particularly intended for driving a generator (not illustrated) from a running axle 1 of a railway vehicle.

In the hypoid-bevel gearing illustrated, the driving wheel 2 is removably mounted upon and rigidly connected to a quill 3 which surrounds the axle 1 with substantial clearance and which carries a casing 4 by means of roller bearings 5. The driven wheel is mounted upon a shaft 7 carried by bearings in an extension 9 of the casing (Figure 1). Suitable transmission arrangements for use between the shaft 7 and the generator are well known and need not be described here. A torque arm 10 is also arranged in known manner.

The quill 3 projects, through oil seals 11, beyond the side of the casing 4 and has a flanged annular member 12 secured upon each of its ends by splines 13. Beyond each end of the quill 3, a flanged annular member 14 is mounted, as hereinafter described, over a number of segmental driving pads 15 lined at 16 with friction material and embracing the axle 1. For example, metal pads 15 may have sheet rubber 16 bonded to them or rubber blocks received in pockets in their faces. The flanges of the adjacent members 12, 14 are spaced apart axially by a short distance and the quill 3 is elastically mounted upon and driven by the axle 1 through a number of rubber and metal coupling elements, for example eight such elements, disposed between the respective faces of the flanges and circumferentially spaced from each other. The quill 3, casing 4 and flanged members 12, 14 are each made in one piece (i. e. are undivided radially).

Preferably and as illustrated, each coupling element comprises a cylindrical rubber bush 17, which is a force fit in a cavity 18 in the flange of the annular member 14, and a central stud 19 which is secured in the flange of the member 12 by means of a nut 20, and a collar 21 abutting against a shoulder on the stud, the collar 21 being clear of the member 14.

The annular members 14 are mounted by means of a number of jacking screws 22 screwed in tapped radial holes in the said members and having reduced plain ends 23 engaged in round recesses in the pads 15. There may suitably be eight such pads 15 and in this case the positions of the screws 22 may be alternated circumferentially with the positions of the coupling elements 17-21 (Fig. 1), lock nuts 24 with auxiliary lock washers 25 serve to hold the screws 22 in their adjusted positions.

The whole gearing, including the annular members 14, is assembled over the rings of pads 15. The gearing is then centered upon the axle by means of the jacking screws 22, the adjusted positions being finally locked by the nuts 24. In this fashion, the gearing can be centered with a high degree of accuracy and this accurate centering cannot be disturbed by normal working shocks. The coupling elements 17-21 provide the necessary resilience, both as to mounting and drive, between the axle 1, with the parts 14, 15, on the one hand and the quill 3, with the gearing, on the other hand. The pads 15 and jacking screws 22 serve as driving elements, as well as supporting elements, between the axle 1 and the members 14. A required driving torque can be readily provided by employing pads 15 of adequate area and adjusting the screws 22 to exert sufficient compressive force. Circumferentially, the pads 15 may extend nearly into contact with each other (Fig. 3). Axially they may extend well outside the members 14. Normally, each pad will have a sufficient area of contact with the axle 1 to prevent any danger of its turning when the screw 22 is tightened. If desired, however, the pad might be additionally located by abutting a part thereof axially against the member 14.

Preferably, the arrangement should be such that there is room to remove the pads 15 from inside each member 14, if desired, for maintenance purposes and also to displace the said members to permit replacement of the coupling elements 18-21 without removing the member 14 from the axle.

Figures 4 and 5 illustrate the application of the invention to gearing in which a worm wheel 2' is carried upon a wheel centre or short quill 3' running in a diametrically divided casing 4', by means of plain bearings 5'. The quill 3' is resiliently mounted at its ends upon the axle 1 by means of segmental rubber pads 26, as shown four in number, housed in recesses 27 in the said quill. These pads serve to position the gear and to cushion it in relation to the axle, but do not transmit the drive from the latter to the quill. The drive is transmitted by sets of segmental pads 15' lined with friction material 16' and disposed inside diametrically divided annular members 28 which are arranged beyond the ends of the quill 3'. The pads 15', of which there are four in each set, are clamped upon the axle 1, by means of jacking screws 22' mounted in the members 28. As illustrated, these screws are Allen screws which are held in their adjusted positions by lock nuts 24'. Each member 28, whose parts are connected together by bolts 29, is provided with dogs 30 which are slidably engaged in radial slots 31, in the adjacent end of the quill 3' and afford a positive drive to the wheel 2'.

Whenever possible, the gearing is mounted centrally on the axle 1 (as shown in the case of Figure 2), so that, with a tapered axle, the two annular members 28 are on opposing tapers. If however, the gear has to be mounted to one side, as shown in Figure 4, it may be advisable to mount an additional diametrically divided member 32 on the opposite taper and to abut the pads 15' of the adjacent member 28 against it by means of a diametrically divided distance sleeve 33. The additional member 32 is provided with friction-lined pads $15^2$ and jacking screws $22^2$ similar to those of the rings 28. The adjacent pads 26 are abutted against the pads 15' by a further diametrically divided distance sleeve 34. Any tendency of the gear to slip down the taper is thus taken by the thrust in the sleeves 34 and 33.

In the embodiment of the invention illustrated in Figures 6 and 7, the pads 26 are dispensed with and the driving means is utilised also for resiliently supporting the gearing from the axle 1. For this purpose, the rubber linings 16' of the pads 15' are made of sufficient thickness to provide the necessary resilience or cushioning effect. In addition to the clamping bolts 29, the ring 28 has clamping bolts 35 by which it is secured upon the quill or wheel centre 3'. These additional bolts 35 (Fig. 7, left-hand side) are partly let into the end of the said quill to provide a cotter-type of drive.

In the above-described arrangements, the jacking screws serve to transmit the drive or both to transmit the drive and to carry the gearing. They may be used, however, solely for initial positioning of the gear.

I claim:

Power-transmission gearing arrangement for a running axle of a vehicle comprising, in combination with the said gearing and axle, an annular part which embraces the axle and is in drive-transmitting engagement with the gearing, and jacking devices for centering the said annular part in relation to the axle, comprising jacking screws disposed radially of the axle and engaged in the annular part, segmental pads engaged by the screws and resilient material lining the said pads and bearing upon the axle.

LESLIE REGINALD NIXON.

References Cited in the file of this patent

UNITED STATES PATENTS

| Number | Name | Date |
|---|---|---|
| 255,196 | Ross | Mar. 21, 1882 |
| 2,160,445 | Spicer | May 30, 1939 |
| 2,426,132 | Williams | Aug. 19, 1947 |